UNITED STATES PATENT OFFICE.

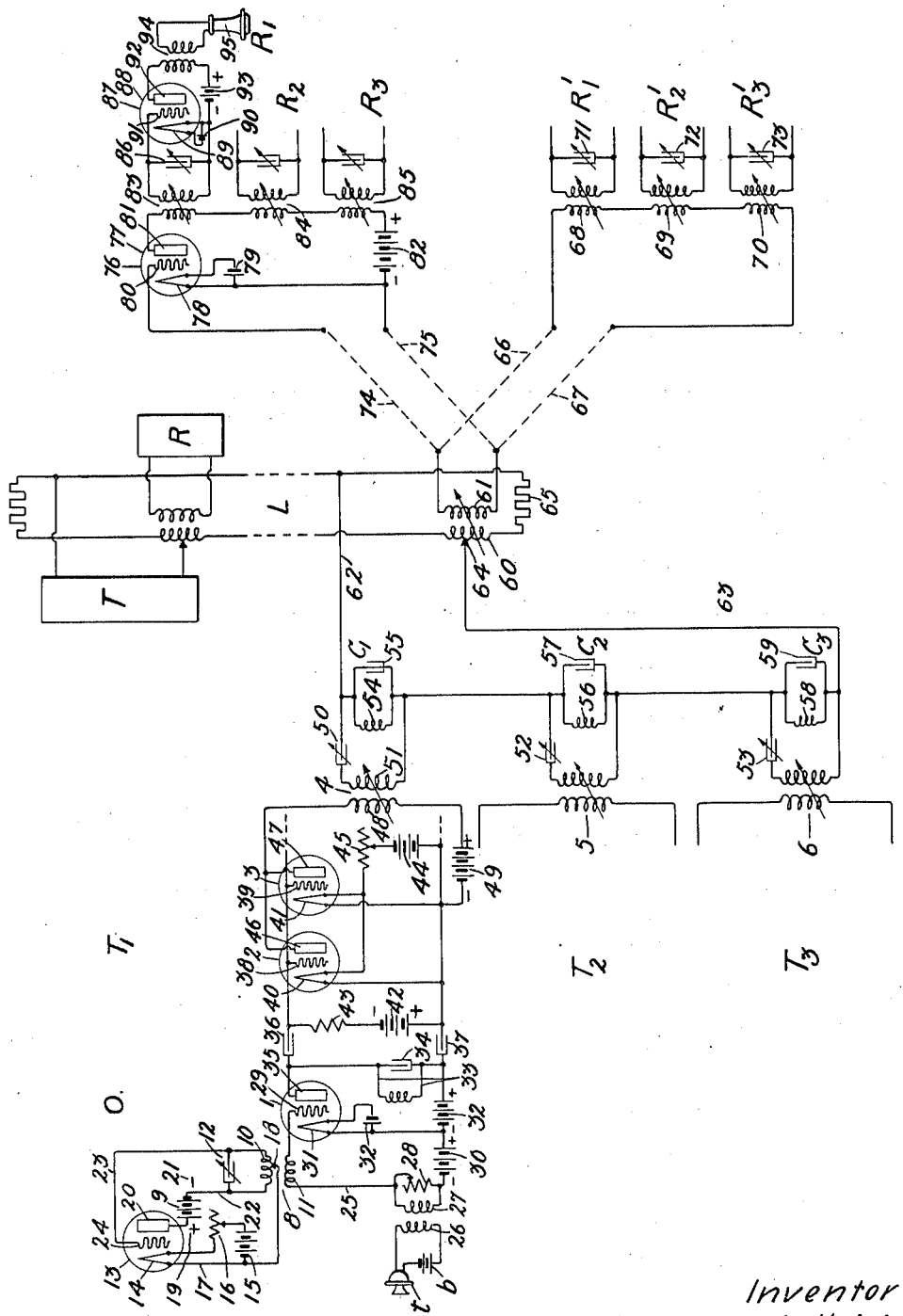

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

HIGH-FREQUENCY-CARRIER TELEPHONY.

1,313,483.   Specification of Letters Patent.   Patented Aug. 19, 1919.

Application filed August 14, 1916. Serial No. 114,776.

*To all whom it may concern:*

Be it known that I, RAYMOND A. HEISING, a citizen of the United States, residing at East Orange, in the county of Essex and State of New Jersey, have invented certain new and useful Improvements in High-Frequency-Carrier Telephony, of which the following is a full, clear, concise, and exact description.

This invention relates to multiplex signaling and has for its object the simultaneous transmission of a plurality of messages over a single circuit.

In a multiplex system, it is necessary that energy be sent out from one end of the line which also serves to receive signals transmitted from a distant station. Furthermore, it is necessary that signals be simultaneously sent from and received at one end of the line and it is a further object of my invention to prevent the outgoing energy from getting into or affecting the local receiving apparatus.

In the system disclosed, it is possible to talk simultaneously at a plurality of different frequencies and to receive simultaneously at the corresponding frequencies. Another object of my invention is to send the energy from one transmitter out over the line without having that energy encounter the impedance of the remaining transmitters, and to remove the impedance of the transmitters from the line, so far as the incoming energy is concerned.

A further object of my invention is to provide a novel form of artificial line in a balancing network for high frequency systems, it being shown in the following theoretical considerations how this object may be attained.

For a line containing distributed inductance and capacity, Heaviside derived equations which may be expressed in complex quantities in the following form:

$$I = \frac{1}{2}\left(I_0 + \sqrt{\frac{Y}{Z}}E_0\right)\epsilon^{(\alpha+j\beta)l} + \frac{1}{2}\left(I_0 - \sqrt{\frac{Y}{Z}}E_0\right)\epsilon^{-(\alpha+j\beta)l} \quad (1)$$

$$E = \frac{1}{2}\left(E_0 + \sqrt{\frac{Z}{Y}}I_0\right)\epsilon^{(\alpha+j\beta)l} + \frac{1}{2}\left(E_0 - \sqrt{\frac{Z}{Y}}I_0\right)\epsilon^{-(\alpha+j\beta)l} \quad (2)$$

where $\alpha =$ attenuation constant.
$\beta =$ wave length constant.
$\alpha + j\beta =$ propagation constant.
$Y =$ admittance per unit length.
$Z =$ impedance per unit length.

E and I are the voltage and current at any point distant $l$ from the point where $E_0$ and $I_0$ are known. $E_0$ and $I_0$ are voltage and current at the point from which $l$ is measured and $l$ is positive when measured toward the point of power supply. Changing this so that $l$ is measured away from the power supply point, then $E_0$ and $I_0$ are the supplying voltage and current and the equations become $$I = \frac{1}{2}\left(I_0 + \sqrt{\frac{Y}{Z}}E_0\right)\epsilon^{-(\alpha+j\beta)l} + \frac{1}{2}\left(I_0 - \sqrt{\frac{Y}{Z}}E_0\right)\epsilon^{-(\alpha+j\beta)l} \quad (3)$$

$$E = \frac{1}{2}\left(E_0 + \sqrt{\frac{Z}{Y}}I_0\right)\epsilon^{-(\alpha+j\beta)l} + \frac{1}{2}\left(E_0 - \sqrt{\frac{Z}{Y}}I_0\right)\epsilon^{-(\alpha+j\beta)l} \quad (4)$$

It is seen that the current or voltage consists of two parts, one decreasing logarithmically away from the supply end, and the other increasing logarithmically away from the supply end. This latter is called the "reflected" wave and is absent if the line is terminated in a proper impedance and also if the line is infinite in length, otherwise we should have power increasing along the line instead of decreasing. Consider a line infinite in length or of such length that the reflected current is extremely small at the supply end. To make this term $$\frac{1}{2}\left(I_0 - \sqrt{\frac{Y}{Z}}E_0\right)\epsilon^{(\alpha+j\beta)l}$$

disappear, $$I_0 - \sqrt{\frac{Y}{Z}}E_0$$

must $= 0$ or the supply voltage $E_0$ divided by the supplied current $I_0$ gives the line impedance $$\frac{E_0}{I_0} = \sqrt{\frac{Z}{Y}} \quad (5)$$

On neglecting the reflected wave, the remainder of the equation gives the same result. This is readily apparent by dropping the second term in equation 3, in making $l = 0$ and in making $I = I_0$.

This is sometimes called the "surge" impedance, because no account is taken of the influence of the reflected wave on the impedance.

$$\sqrt{\frac{Z}{Y}} = \sqrt{\frac{r+jx}{g+jb}} \text{ is the complex expression.} \quad (6)$$

where
$r$ = line resistance per unit length.
$x$ = line inductive reactance per unit length = $\omega L$.
$g$ = line leakage conductance per unit length.
$b$ = line condensive susceptance per unit length = $\omega C$.
$L$ = inductance.
$C$ = capacity.

If the frequency is so high that $r$ is small in comparison to $x$, and $g$ is small in comparison to $b$, these small quantities may be neglected in comparison to $x$ and $b$ and equation (6) becomes $$\sqrt{\frac{r+jx}{g+jb}} = \sqrt{\frac{j\omega L}{j\omega C}}\sqrt{\frac{L}{C}} \quad (7)$$

a real number and if substituted in equation (5)

$$\frac{E_0}{I_0} = \sqrt{\frac{L}{C}} \quad (8)$$

it shows that the complex numbers E and I have a real ratio, or are in phase at the supply end. This only occurs when the load is a pure resistance.

A method of showing the decrease in resistance with frequency is to take the surge impedance value $$\sqrt{\frac{Z}{Y}}$$

and resolve it into its real and complex parts $$\sqrt{\frac{r+jx}{g+jb}} = +\frac{1}{\sqrt{g^2+b^2}}\sqrt{\frac{1}{2}(\sqrt{r^2+x^2}\sqrt{g^2+b^2}+rg+bx)}$$
$$-j\frac{1}{\sqrt{g^2+b^2}}\sqrt{\frac{1}{2}(\sqrt{r^2+x^2}\sqrt{g^2+b^2}-rg-bx)} \quad (9)$$

The first term being the real term is the resistance of the line. If we make $r$ and $g = 0$ we get $$\text{Res.} = \frac{1}{b}\sqrt{\frac{1}{2}(bx+bx)} = \sqrt{\frac{x}{b}} = \sqrt{\frac{L}{C}} \quad (10)$$

which is the same result as was secured before (8). If we make $g = 0$ in the imaginary term, $$\text{React.} = \frac{1}{\sqrt{b^2}}\sqrt{\frac{1}{2}(\sqrt{b^2}\sqrt{r^2+x^2}-bx)} \quad (11)$$

which may be expressed in the following form:

$$\text{React.} = \frac{r}{2\omega}\sqrt{\frac{1}{LC}}\left(1 - \frac{1}{4}\frac{r^2}{L^2\omega^2} + \frac{1}{8}\frac{r^4}{L^4\omega^4} - \frac{5}{64}\frac{r^6}{L^6\omega^6} + \ldots\right) \quad (12)$$

which shows that as the frequency becomes large, the radical terms approach the value $\frac{1}{LC}$ but that the reactance continues to vary inversely as $\omega$ according to the equation.

$$\text{React.} = \frac{r}{2\omega}\sqrt{\frac{1}{LC}} \quad (13)$$

As a matter of fact, the reactance is less than one per cent. of the resistance at frequencies above 20,000.

Hence, it appears that at comparatively high frequencies the impedance may be considered as wholly due to a resistance of value $\sqrt{\frac{L}{C}}$ and that this impedance is independent of the frequency since the term ω does not appear in the equation, $$\text{line impedance} = \sqrt{\frac{L}{C}}.$$

This means that it is possible to balance the impedance of the line comprising distributed inductances and capacity by an artificial line whose impedance comprises substantially pure resistance or resistance only, and that the resistance may have a value which is good for all frequencies at or above the comparatively high value assumed.

If, however, $r$, $L$ and $C$ vary with the frequency, new complications ensue. However, L can decrease only to a certain limiting value (that derived by neglecting inductance due to space occupied by the wire itself); and Kelvin has indicated that the resistance of long cylindrical wires increases as $\sqrt{f}$. Therefore at the most, considering these variations on overhead telephone lines, the reactance could have a modified equation $$\text{Reactance} = \frac{1}{2k\sqrt{\omega}}\sqrt{\frac{1}{L'C}} \quad (15)$$

where $k$ = a numeric, $L'$ = the limiting value of $L$, the reactance having the value indicated in equation 13, except that $$r = \frac{\sqrt{\omega}}{k}$$

as assumed from Kelvin, which would still show that a line with uniformly distributed inductance and capacity tended to act as a pure resistance at high frequencies.

The frequency above the value at which the resistance becomes independent of the frequency in an overhead line is about 500 cycles, and at frequencies above 20,000 the reactance is less than one per cent. of the resistance, facts which make it possible to use a pure resistance for the artificial line which is good for all frequencies above 20,000.

Proceeding to a detailed description of the invention disclosed, reference is made to the drawing in which the figure shows diagrammatically the circuit connections for a plurality of transmitter and receiver circuits.

Signals may be sent over the line L to a distant station or stations from any one or all of the transmitter circuits $T_1$, $T_2$, $T_3$. And the line L is adapted to transmit signals from a distant station or stations to any one or all of the receiver circuits, $R_1$, $R_2$, $R_3$, or to any one or all of the alternative receiver circuits, $R_1'$, $R_2'$, $R_3'$.

The transmitter circuits $T_1$, $T_2$ and $T_3$ are substantial duplicates, the only difference being in the adjustments of the various elements so that each transmitter circuit may transmit oscillations of a frequency different from that of all the others, both at the end of the line shown and at the other end of the line. The same is true of the receiver circuits $R_1$, $R_2$, $R_3$, $R_1'$, $R_2'$, $R_3'$, each of which is tuned to the frequency of its corresponding transmitter at the other end of the line.

In each transmitter circuit, the high frequency oscillations produced by the oscillator O, which may be characterized as carrier oscillations, are modulated in accordance with signal waves by means of the transmitter $t$ and the modulator $l$. The oscillator herein described is the invention of another and constitutes a part of the present invention only as one element of the system. The modulator *per se* is likewise the invention of another and constitutes a preferred form of means for causing the amplitude of the feeble high frequency oscillations to vary in accordance with the wave form of the message wave. This is accomplished by impressing the message wave or impulse together with the high frequency oscillations on the input circuit of a thermionic device herein styled a modulator. The modulated oscillations are amplified by the power tubes or amplifiers 2 and 3 and are impressed on the line through the transformer 4.

The oscillator O comprises a variable transformer 8 supplied with energy from battery 9—variations in the battery current through the primary 10 causing corresponding variations in the E. M. F. induced in the secondary 11. The frequency of the oscillations is determined by the value of the adjustable condenser 12, shunted across the adjustable primary 10, and which forms with the latter a tuned circuit. Variations in the battery current are produced by the vacuum tube 13, which comprises a cathode or filament 14 heated by current supplied from battery 15 through the adjustable resistance 16. Terminal 17 of the filament 14 makes an adjustable connection 18 with the transformer primary 10. The positive terminal 19 of battery 9 is connected to the anode or plate 20, the negative terminal 21 being connected by lead 22 to one terminal of condenser 12 and transformer primary 10, the condenser being in shunt to the primary; the other terminal of the primary and condenser forming lead 23 connected to grid 24.

As to the operation of the oscillator, the battery 9 supplies current through a circuit including plate 20, filament 14, lead 17, through that part of the primary 10 included by the adjustable connection 18 to the negative terminal of the battery. This comprises what may be termed the secondary circuit of the oscillator, the primary circuit of which includes filament 14, lead 17, that portion of transformer primary 10 between adjustable connector 18 and lead 23, and the grid 24. Variations in the potential between filament 14 and grid 24 cause amplified variations in the current delivered by the battery in the secondary circuit. Furthermore, the battery current in the secondary circuit including electrode 20 and filament 14 is a function of the potential of grid 24. The two parts of the transformer primary 10 are inductively related and variations in the battery current through that part of the transformer primary 10 included in the secondary circuit of the oscillator induce an E. M. F. in the remaining part of transformer primary 10 included in the primary circuit of the oscillator.

The current in the oscillator secondary circuit is established by the battery 9, such increase in the current being alternately opposed and aided by the consequent potential of the grid 24, caused by the inductive action of the two parts of the transformer primary 10. This is productive of oscillations in the battery current through the transformer primary 10 and the period of such oscillations is determined by the adjustment of the regulable condenser 12, shunted across the transformer primary 10.

Variations in the current in transformer primary 10 cause corresponding variations in the E. M. F. induced in the transformer secondary 11 in the transmitter circuit. The oscillations set up by the transformer secondary 11 are combined in line 25 with the oscillations produced by the transmitter $t$ which causes variations in current supplied by battery $b$ to transformer primary 26. The line 25 makes an adjustable connection with resistance 28 shunted across transformer secondary 28 to vary the amplitude of the transmitter oscillations impressed on the modulator grid 29.

The primary circuit of the vacuum tube or modulator includes grid 29, secondary winding 11, winding 27 and resistance 28 in shunt to the latter, battery 30 and filament or cathode 31 heated by battery 32. The battery 30 imposes a negative potential on the grid or auxiliary electrode 29 by having its negative terminal connected thereto. The secondary circuit of modulator $l$ comprises filament 31 connected to negative of battery 32, the positive terminal of which is connected to the tuned circuit including inductance 33 and capacity 34 in parallel, thence to electrode or plate 35.

The circuit including inductance 33 and capacity 34 is tuned to the oscillator frequency and offers high impedance thereto acting as an anti-resonant circuit, so that these high frequency oscillations will be sent through condensers 36 and 37 and resistance 43. The tuned circuit 33, 34, however, offers low impedance to the passage of currents of any frequencies other than those of the oscillator frequency.

The drop in potential of the modulated high frequency oscillations across resistance 43 is impressed on the primary circuits of the vacuum tubes, power tubes or amplifiers 2 and 3. The vacuum tube 2 incloses cathode or filament 40, anode or plate 46, and the auxiliary electrode or grid 38. Similarly the vacuum tube 3 incloses filament or cathode 41, grid 39, and anode or plate 47. Condenser 36 is connected to grids 38 and 39, and condenser 37 is connected to filament 40 and 41. The battery 42 has its negative terminal connected through resistance 43 to grids 38 and 39 while its positive terminal is connected to filaments 40 and 41. The latter filaments are heated by current from battery 44, the current being regulated by the adjustable resistance 45.

The secondary circuits of the amplifiers 2 and 3 include electrodes 46 and 47 in parallel, primary 48 of transformer 4, and battery 49, the negative terminal of which is connected to the filaments 40 and 41.

The secondary winding 51 of transformer 4 serves as a source of amplified modulated high frequency oscillations, which are to be impressed on the line L for transmission to a properly tuned receiving apparatus at the other end of the line L. In a similar way, modulated oscillations may be impressed on the line L by means of transformers 5 and 6 in the transmitter circuits $T_2$ and $T_3$, respectively.

The elements of the transmitter circuits $T_2$ and $T_3$ are identical with those of transmitter circuit $T_1$, the only difference being in the adjustment of the various circuits whereby each transmitter circuit impresses on the line L a carrier frequency different from that impressed by the other transmitter circuits.

It would be unsatisfactory to have the secondary windings of transformers 4, 5 and 6 directly connected in the line L because each secondary winding would serve as a choke coil for current transmitted from all of the others, and each secondary winding would thereby impede the passage of the high frequency currents.

To effectively remove the impedance that secondary winding 51 would otherwise offer to currents from transmitter circuits other than $T_1$, the anti-resonant circuit $C_1$ is connected in shunt to the winding 51. This anti-resonant circuit comprises condenser 55 and inductance 54 which are supplied in parallel by the winding 51.

The anti-resonant circuit $C_1$ is tuned to the high frequency supplied by transmitter circuit $T_1$. The anti-resonant circuit $C_1$ then offers a path of high impedance to currents supplied by transmitter circuit $T_1$, and these currents flow through the comparatively low resistance path provided by the line L. This low resistance path is tuned to the frequency supplied by transmitter circuit $T_1$ by means of adjustable condenser 50.

The currents supplied by transmitter circuits $T_2$, $T_3$ or by the transmitter circuits at the other end of the line, being of a frequency different from that for which anti-resonant circuit $C_1$ is tuned, find this anti-resonant circuit a path of low impedance.

It is to be noted then that an anti-resonant circuit, comprising an inductance and a capacity supplied from a source in parallel, when tuned to the frequency of the source, provides a high impedance path to currents from that source and a low impedance path to currents of other frequencies. The usual type of oscillation circuit includes an inductance and a capacity connected in series with a source and tuned to the frequency of that source in order that this circuit may be more receptive to currents from that source than to currents of frequencies different from that for which said circuit is tuned.

The term "anti-resonant" circuit is accordingly here used to designate a circuit which offers high impedance to the passage of currents of the same frequency as that for which said circuit is tuned, but which provides a low impedance path for currents of other frequencies differing from the frequency for which the anti-resonant circuit is tuned.

In a manner similar to that described in connection with transmitter circuit $T_1$, the transmitter circuits $T_2$ and $T_3$ are provided with adjustable condensers 52 and 53 and with anti-resonant circuits $C_2$ and $C_3$, respectively. Inductance 56 and capacity 57 are provided in anti-resonant circuit $C_2$ and anti-resonant circuit $C_3$ includes inductance 58 and condenser 59. Anti-resonant circuit $C_2$ is tuned to the frequency supplied by transmitter circuit $T_2$ and a similar remark applies to the relation between the tuning of anti-resonant circuit $C_3$ and the frequency supplied by transmitter circuit $T_3$.

Each of the transmitter circuits $T_1$, $T_2$, $T_3$, supplies carrier oscillations of a frequency different from those supplied by the remaining transmitter circuits. Hence, each anti-resonant circuit provides a path of high impedance for currents from its associated transmitter circuit and provides a low resistance impedance path to currents from the other transmitter circuits.

The block R at the other end of the line L, conventionally represents a plurality of receiver circuits, each of which is tuned to the frequency of one of the transmitter circuits $T_1$, $T_2$, $T_3$.

Connected in the line L is the transformer primary 60, adjustable with respect to the secondary 61 which supplies the energy of the incoming signals to the receiver circuits $R_1$, $R_2$, $R_3$, $R_1'$, $R_2'$, $R_3'$.

To provide a balancing network for this system, transmitter lead 62 is connected to the line L while lead 63 is connected to the middle point 64 of primary 60. Between the primary 60 and the point of connection of lead 62 with line L, is connected the artificial line 65 which may be non-inductive or of substantially pure resistance, for reasons above noted. Viewing the connections in a different way, the artificial line 65 and that part of primary winding 60 connected between it and connection 64 to lead 63, comprise a bridge connection or shunt about the transmitter circuits connected to leads 62 and 63.

If the impedance of artificial line 65 is exactly the same as the impedance of the line L, then currents due to transmitter circuits $T_1$, $T_2$, $T_3$, in the two halves of primary winding 60 will be equal in value, and as these currents flow in opposite directions in the two halves of the primary winding 60, the resultant effect on the secondary 61 is *nil*, so that the outgoing energy has no effect on the local receiving apparatus. However, current of the incoming signals passes in the same direction through the two parts of primary 60, so that the incoming energy is transferred to the local receiving apparatus. The local transmitting path 62, 54, 56, 58, 63 and the local receiving path 74, 76, 75 are therefore conjugate at the carrier frequencies.

The transformer secondary 61 is connected either to the receiver circuits $R_1$, $R_2$, $R_3$, or to receiver circuits $R_1'$, $R_2'$, $R_3'$. If it is desired to separate the different frequencies before amplifying and detecting, the transformer secondary 61 is connected to receiver circuits $R_1'$, $R_2'$, $R_3'$, connection being made by lines 66 and 67 to primary windings of the adjustable transformers 68, 69 and 70. By means of the variable condensers 71, 72 and 73, the secondary circuits of transformers 68, 69 and 70 are tuned to the carrier frequency supplied by the corresponding transmitter circuit at the other end of the line L. The transmitter and receiver circuits at the other end of the line are similar to those shown in detail and are conventionally represented by the blocks T and R. To each tuned circuit $R_1'$, $R_2'$, $R_3'$ is connected the amplifying, detecting and receiving apparatus.

Preferably, however, the transformer secondary 61 is connected to receiving circuits $R_1$, $R_2$, $R_3$. Furthermore, a common amplifier may be provided with this arrangement.

As shown, transformer secondary 61 is connected by lines 74 and 75 to the primary or input circuit of the amplifier which comprises the evacuated vessel 77, inclosing cathode or filament 78 heated by battery 79, the grid or auxiliary electrode 80 and the plate or anode 81. Line 74 is connected to the grid 80 and line 75 to the filament 78. The secondary or output circuit of the amplifier 76 comprises anode 81, the primary windings of the variable transformers 83, 84, 85, in series, and the battery 82, the negative terminal of which is connected to the cathode 78. It will be noted that since the amplifier 76 does not have an exactly linear characteristic, it tends to act as a modulating device and if the transmitted as well as the received high frequency currents were allowed to act thereupon, it would tend to cause intermodulation between the transmitted and received currents.

Amplified modulated oscillations of a given frequency are selected by the tuned circuit comprising the secondary winding of transformer 83 and the variable condenser 86, shunted thereacross, and these oscillations are impressed on the input circuit of the detector 87. This detector comprises an evacuated vessel which incloses cathode 89 heated by battery 90, grid 91 and plate 92, the grid 91 and filament 89 forming the terminals of the primary or input circuit connected to the secondary winding of transformer 83. The anode 92 and cathode 89 are the terminals of the detector output circuit and are in circuit with battery 93, having its negative terminal connected to the cathode 89, and the primary winding of transformer 94, the secondary of which is connected to the receiver 95.

The receiving circuits $R^2$ and $R^3$ are substantial duplicates of receiving circuit $R^1$, the only difference being in the adjustments of the condensers and inductances, whereby each is tuned to a frequency different from that of the others, this frequency being that of the oscillations furnished by the generator in the corresponding transmitter circuit at the other end of the line.

It will be apparent, therefore, that in the preferred form, the incoming signals are received by a single amplifier, and then sent to the various tuned circuits where they are detected and received by the signaling instrument or receiver.

While my invention has been described with particular reference to a "wired" system, it is obvious that all its features are not restricted to such use, and that the line L may be inductively or conductively disposed with reference to the receiving or transmitting apparatus of a wireless system.

What is claimed is:

1. A multiplex transmitting system comprising a line, an anti-resonant circuit therein, a transmission circuit shunted around said anti-resonant circuit, and means for applying signaling voltages to said transmission circuit.

2. A multiplex transmission system comprising a line, an anti-resonant circuit therein, a transmission circuit shunted around said anti-resonant circuit, and means for applying undamped signaling voltages of the approximate frequency to which said anti-resonant circuit is tuned to said transmission circuit.

3. A multiplex transmission system comprising a line, an anti-resonant circuit therein, and a transmission circuit including a transformer secondary and a capacity shunted around said anti-resonant circuit.

4. A multiplex transmission system comprising a line, an anti-resonant circuit therein, a transmission circuit shunted around said anti-resonant circuit, means for applying high frequency carrier current voltage to said transmission circuit, and means for tuning said transmission circuit.

5. The combination with a transmission line of an artificial line simulating the impedence of the transmission line at high frequencies and comprising substantially pure resistance of a value equal approximately to $\sqrt{\frac{L}{C}}$, where L and C denote the distributed inductance and the distributed capacity respectively, per unit length of line.

6. A multiplex transmission system comprising the combination of a transmission line with an artificial line composed wholly of substantially non-inductive resistance for balancing said transmission line for high frequency currents.

7. A multiplex intelligence transmission system comprising a plurality of high frequency transmitter and receiver circuits, and a balancing network for said system comprising an artificial line of substantially pure resistance.

8. A multiplex intelligence transmission system comprising a line wire, a plurality of transmitter circuits at one end of said line wire, means for generating high frequency oscillations in said circuits, a plurality of receiver circuits at the same end of said line wire, each being tuned to a different frequency, a balancing network for said transmitter and receiver circuits comprising an artificial line of substantially pure resistance, and coöperating receiver and transmitter circuits at the other end of said line wire.

9. In a multiplex intelligence transmission system, the combination of a line wire, a plurality of transmitter circuits at one end of said line wire serially connected therewith, means for generating high frequency oscillations in said transmitter circuits, a plurality of receiver circuits at the same end of said line wire, each being tuned to a different frequency, a repeating coil having its primary connected in said line wire and its secondary connected to said receiver circuits, a bridge connection for said transmitter circuits comprising an artificial line of substantially pure resistance in circuit with the primary of said repeating coil, and coöperating receiver and transmitter circuits at the other end of said line wire.

10. In a multiplex intelligence transmission system, the combination of a line wire, a plurality of transmitter circuits at one end of said line wire serially connected therewith, anti-resonant circuits in shunt to said transmitter circuits, means for generating high frequency oscillations in said transmitter circuits, a plurality of receiver circuits at the same end of said line wire, each being tuned to the frequency of one of said generating means, a balancing network for said transmitter and receiver circuits comprising an artificial line composed chiefly of resistance, and coöperating receiver and transmitter circuits at the other end of said line wire.

11. In a multiplex intelligence transmission system, the combination of a line wire, a plurality of transmitter circuits at one end of said line wire serially connected therewith, anti-resonant circuits in shunt to said transmitter circuits, means for generating high frequency oscillations in said transmitter circuits, signaling means for modifying said oscillations, a plurality of receiver circuits at the same end of said line wire, each being tuned to a different frequency, a repeating coil having its primary connected in said line wire and its secondary connected to said receiver circuits, a bridge connection for said transmitter circuits comprising an artificial line of substantially pure resistance in circuit with the primary of said repeating coil, and coöperating receiver and transmitter circuits at the other end of said line wire.

12. The method of multiplex carrier current signaling by transferring energy from a plurality of transmission channels to a single line circuit which comprises setting up an undamped periodic current in each channel and producing by the current in each channel an electromotive force in an element in said line circuit individual to said channel, said element having high impedance for currents of the frequency induced therein, and low impedance for other frequencies.

13. A multiplex carrier current signaling system comprising a single line circuit, a plurality of transmission channels, means for setting up an undamped periodic current in each channel, a plurality of elements in said line circuit, each said element having high impedance for periodic current of the frequency corresponding to the current produced in one of said channels and low impedance for the other frequencies, and means whereby the current in each channel produces an electromotive force in the element having high impedance for currents of the frequency produced in said channel.

14. In a multiplex signaling system, a transmission line which is the equivalent of a long line having substantially uniformly distributed capacity, inductance and resistance, a balancing means for said line, a local receiving station, and transmission means for impressing a plurality of high frequency carrier current voltages upon said line, said line and said balancing means constituting parallel paths with respect to said transmission means, said paths being equally coupled to said receiving station.

15. A multiplex signaling system comprising a local transmitting path, a local receiving path, a line having substantially uniformly distributed capacity, inductance and resistance, a balancing impedance means for the line, means for impressing a plurality of high frequency carrier current voltages on said transmitting path, said transmitting path and said receiving path being substantially conjugate at the frequencies of all the carrier current voltages.

16. A speech transmission system comprising a local transmitting path, a local receiving path, a line having substantially uniformly distributed capacity, inductance and resistance, a balancing impedance means for the line, means for impressing a modulated high frequency carrier current voltage on said transmitting path, said transmitting path and said receiving path being substantially conjugate at the carrier frequency.

17. A multiplex signaling system comprising a local transmitting path, a local receiving path, a line having substantially uniformly distributed capacity, inductance and resistance, a balancing impedance means consisting wholly of resistance for the line, means for impressing a plurality of high frequency carrier current voltages upon said transmitting path, said transmitting path and said receiving path being substantially conjugate at all the carrier current frequencies.

18. A speech transmission system comprising a local transmitting path, a local receiving path, a line having substantially uniformly distributed capacity, inductance and resistance, a balancing impedance means for the line, said means being wholly composed of non-reactive resistance, and means for impressing a modulated high frequency carrier current voltage upon said transmitting path, said transmitting path and said receiving path being substantially conjugate at the carrier current frequency.

19. A carrier current duplex transmission system comprising a line, local transmitting means for impressing outgoing signals upon said line, an amplifier having non-uniform amplifying power for impressed voltages of different magnitude coupled to the line for amplifying incoming signals, and means for preventing intermodulation between the outgoing and incoming signals by said amplifier.

20. The method of transmission which comprises impressing transmission currents at a station upon a line, simultaneously receiving other currents at said station from a distant station, amplifying said received currents, and preventing intermodulation between said received currents and said impressed transmission currents during the amplification of said received currents.

21. A transmission system comprising two sources of bands of alternating current of different frequencies, a line, a plurality of means in series in said line associating each of said sources with said line respectively, and each comprising inductance and capacity elements, each of said means offering higher impedance to the currents from its associated source than to currents from the other source.

22. A telephone system comprising two sources of alternating current, a line, means for associating one of said sources with said line, means for associating the other of said sources with said line, said last mentioned means offering high impedance to currents set up in said line by the source associated therewith but low impedance to currents set up by the other of said sources, each of said means comprising inductance and capacity elements.

23. A transmission system comprising a plurality of communicating transmitter and receiver circuits, each of said transmitter circuits comprising a source of carrier oscillations, a source of low frequency oscillations and means for modulating the former in accordance with the latter; and means for preventing the oscillations supplied by one of said transmitter circuits from being impressed on the modulator in another of said transmitter circuits.

24. In a receiving system, the combination of a plurality of receiver circuits each comprising means for selectively transmitting a modulated wave from a given sending station, means for asymmetrically conducting the transmitted wave to said selective means, and a detector adapted to be supplied by said selective means.

25. In a receiving system, the combination of a plurality of receiver circuits each comprising a filter for selectively transmitting a modulated wave from a given sending station, a thermionic device for asymmetrically conducting the transmitted wave to said filter, a detector adapted to be supplied by said filter, and a signal circuit associated with said detector.

In witness whereof, I hereunto subscribe my name this 12th day of August, A. D. 1916.

RAYMOND A. HEISING.